United States Patent
Kenney (10) Patent No.: US 8,089,985 B2
(45) Date of Patent: Jan. 3, 2012

(54) MAX-MIN FAIR NETWORK BANDWIDTH ALLOCATOR

(75) Inventor: John B. Kenney, Granger, IN (US)

(73) Assignee: Tellabs Operations Inc., Naperville, IL (US)

( * ) Notice: Subject to any disclaimer, the term of this patent is extended or adjusted under 35 U.S.C. 154(b) by 89 days.

(21) Appl. No.: 12/249,151

(22) Filed: Oct. 10, 2008

(65) Prior Publication Data

US 2010/0091793 A1 Apr. 15, 2010

(51) Int. Cl.
*H04J 3/22* (2006.01)

(52) U.S. Cl. .................................................. 370/468

(58) Field of Classification Search ............ 370/395.21, 370/395.41, 468; 709/228
See application file for complete search history.

(56) References Cited

U.S. PATENT DOCUMENTS

2004/0136379 A1* 7/2004 Liao et al. ................ 370/395.21

* cited by examiner

*Primary Examiner* — Seema Rao
*Assistant Examiner* — Leon Andrews
(74) *Attorney, Agent, or Firm* — Fitzpatrick, Cella, Harper & Scinto (57) ABSTRACT

Allocation of an amount of available bandwidth among a plurality of users of a computer network is provided. Each user has a maximum allocation of bandwidth. Tier information of a plurality of tiers is accessed. In the tier information, users are grouped according to maximum allocation. Tier information includes a breakpoint value of each tier. The available bandwidth is allocated in one example embodiment by (1) allocating the maximum allocations to users in tiers with breakpoint values less than or equal to the amount of available bandwidth, and (2) allocating remaining available bandwidth in a fair manner among remaining users, which are users in tiers with breakpoint values greater than the amount of available bandwidth. The breakpoint value of at least one tier is a minimum amount of bandwidth that must be allocated in a Max-Min fair manner among the plurality of users such that each user in the tier receives its maximum allocation of bandwidth.

20 Claims, 6 Drawing Sheets

MAX-MIN FAIR NETWORK BANDWIDTH ALLOCATOR

BACKGROUND

1. Field

Example aspects of the invention relate to a procedure, system, apparatus, and program for allocating network bandwidth in a Max-Min fair manner, and, in particular, to bandwidth allocation using breakpoints based on tiers formed by grouping users according to maximum allocation information.

2. Related Art

In the highly-connected computing environments of the present day, multiple users often must share a limited computing resource. If total user demand for a shared resource exceeds the amount of resource available, the resource must be apportioned among the users. In the field of computer networking, for example, many methods have been developed to allocate shared network bandwidth to users in a fair and/or efficient manner. In particular, some bandwidth allocation systems apportion available bandwidth among competing users over an interval of time such that Max-Min fairness is achieved.

Max-Min fairness (MMF) is a well-known fairness objective that describes an end result of an allocation of a quantity of resources among a set of competing users. Specifically, as a result of a Max-Min fair allocation of an available resource, the resource allocation between two users is equal (or is in a ratio equal to the ratio of users' weights in a weighted Max-Min fairness system), except that each user's allocation is also subject to a respective maximum allocation. However, Max-Min fairness is a principle whose definition is not "constructive." In other words, while the principle of MMF provides an objective end result of an allocation, MMF definition does not provide a method to achieve this final allocation.

Some existing approaches to designing a method to achieve MMF allocation of available bandwidth are both computationally inefficient and inexact. For example, one approach is to cycle through the users, providing each with a small unit of bandwidth allocation during each iteration, but bypassing any user whose net allocation has reached its maximum. This approach is inefficient because it is likely to involve a large number of iterations, each of which involves memory accesses, comparisons with a user's maximum allocation, and arithmetic operations to increment the allocation. This approach is also inexact, since it is limited in precision by the size of the unit of bandwidth allocation.

BRIEF DESCRIPTION

The foregoing can be addressed with a procedure for allocation of network bandwidth using predetermined breakpoints based on tiers associated with user maximum allocation information, and also by a bandwidth allocation device, communication system, and computer program that operate in accordance with the procedure.

In one example embodiment of the invention, a procedure for allocating an amount of available bandwidth among a plurality of users of a computer network is provided. Each user has a maximum allocation of bandwidth. Tier information of a plurality of tiers is accessed. In the tier information, users are grouped according to maximum allocation, and the tier information includes a breakpoint value of each tier. The available bandwidth is allocated by (1) allocating the maximum allocations to the users in tiers with breakpoint values less than or equal to the amount of available bandwidth, and (2) allocating a remaining amount of available bandwidth in a fair manner among remaining users, which are the users in tiers with breakpoint values greater than the amount of available bandwidth. In one example, the breakpoint value of at least one tier is an amount of bandwidth that must be allocated in a Max-Min fair manner among the plurality of users such that each user in the tier receives its maximum allocation of bandwidth.

According to an example aspect of the invention, the breakpoint value of the lowest tier equals a product of the lowest maximum allocation and a total number of users in the plurality of users, and the breakpoint value of at least one higher tier equals the sum of (1) the breakpoint value of a lower tier and (2) the product of (a) a number of users in tiers corresponding to maximum allocations greater than that associated with the lower tier and (b) a difference between a higher maximum allocation associated with the at least one higher tier and a lower maximum allocation associated with the lower tier. According to an example embodiment of the invention, the lower tier is a next, lower tier than the lower tier.

In another example embodiment of the invention, each user has a weight, a normalized maximum allocation of bandwidth, and a maximum allocation of bandwidth that is the product of the weight and the normalized maximum allocation. Tier information of a plurality of tiers is accessed. In the tier information, users are grouped according to normalized maximum allocation, and the tier information includes a breakpoint value of each tier. The available bandwidth is allocated by (1) allocating maximum allocations to the users in tiers with breakpoint values less than or equal to the amount of available bandwidth, and (2) allocating a remaining amount of available bandwidth in a weighted fair manner among remaining users, which are the users in tiers with breakpoint values greater than the amount of available bandwidth. The breakpoint value of a tier is an amount of bandwidth that must be allocated in a weighted Max-Min fair manner among the plurality of users such that each user in the tier receives its maximum allocation of bandwidth.

In another example aspect of the invention, the remaining amount of available bandwidth is allocated among the remaining users in accordance with the relative weights of the remaining users, the allocation for each user equaling a product of the user's weight and a term that is a function of the excess bandwidth above the breakpoint. In a further example aspect of the invention, the breakpoint value of the lowest tier equals a product of the lowest normalized maximum allocation and the weighting factor of the lowest tier, and the breakpoint value of at least one non-lowest tier equals a sum of (1) the breakpoint value of a lower tier (e.g., a next lower tier) than the non-lowest tier, and (2) an incremental factor of the at least one non-lowest tier. The incremental factor is a product of (1) a weighting factor and (2) a difference between the normalized maximum allocation of the at least one non-lowest tier and a lower normalized maximum allocation associated with the lower tier (e.g., the next lower tier).

The example embodiments of the invention may be embodied in, without limitation, a procedure, apparatus, or computer-executable program instructions.

DETAILED DESCRIPTION

Example environments that are suitable for practicing example embodiments of the invention will now be described. Then, example embodiments of the invention will be described below. The descriptions of example environments and example embodiments are described with reference to the accompanying drawings. The example embodiments describe an apparatus, system, procedure, and computer program for allocating network bandwidth in a Max-Min fair manner.

One example environment in which example embodiments of the invention can be implemented is a fiber optic network. Fiber optic networks generally are referred to as fiber-to-the-home (FTTH), fiber-to-the-premises (FTTP), fiber-to-the-business (FTTB), fiber-to-the-node (FTTN), or fiber-to-the-curb (FTTC) networks and the like, depending on the specific application of interest. Such types of networks are also referred to herein generally as "FTTx networks". In a typical FTTx network, equipment at a headend or central office couples the FTTx to external services such as a Public Switched Telephone Network (PSTN) or an external network. Signals received from these services are converted into optical signals and are combined onto a single optical fiber at a plurality of wavelengths, with each wavelength defining a channel within the FTTx network.

In a FTTP network, the optical signals are transmitted through the FTTP network to an optical splitter that splits the optical signals and transmits the individual optical signals over a single optical fiber to a subscriber's premises. At the subscriber's premises, the optical signals are converted into electrical signals using an Optical Network Terminal (ONT). The ONT may split the resultant signals into separate services required by the subscriber such as computer networking (data), telephony and video. In FTTC and FTTN networks, the optical signal is converted to an electrical signal by either an Optical Network Unit (ONU) (FTTC) or a Remote Terminal (RT) (FTTN), before being provided to a subscriber's premises.

Figure 6:
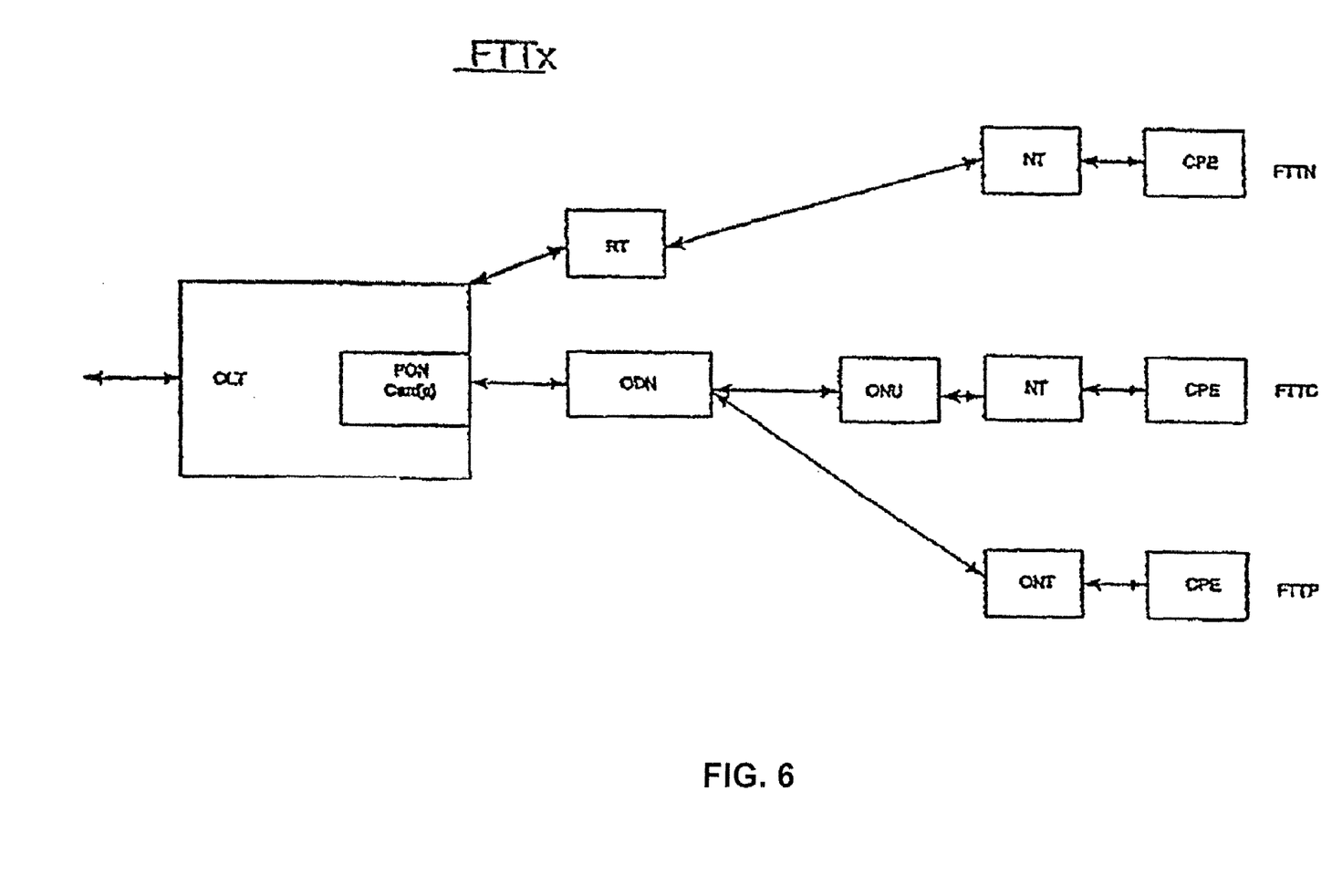
FIG. 6 illustrates a general FTTx network, which also is a suitable environment for practicing example aspects of the invention.

A typical FTTx network often includes one or more Optical Line Terminals (OLTs) which each include one or more Passive Optical Network (PON) cards. Such a network is illustrated in FIG. 6. Each OLT typically is communicatively coupled to one or more ONTs (in the case of a FTTP network), or to one or more Optical Network Units (ONU) (in the case of a FTTC network), via an Optical Distribution Network (ODN). In a FTTP network, the ONTs are communicatively coupled to customer premises equipment (CPE) used by end users (e.g., customers or subscribers) of network services. In a FTTC network, the ONU's are communicatively coupled to network terminals (NT), and the NTs are communicatively coupled to CPE. NTs can be, for example, digital subscriber line (DSL) modems, asynchronous DSL (ADSL) modems, very high speed DSL (VDSL) modems, or the like. In a FTTN network, each OLT typically can be communicatively coupled to one or more RTs. The RTs are communicatively coupled to NTs that are communicatively coupled to CPE.

Figure 1:
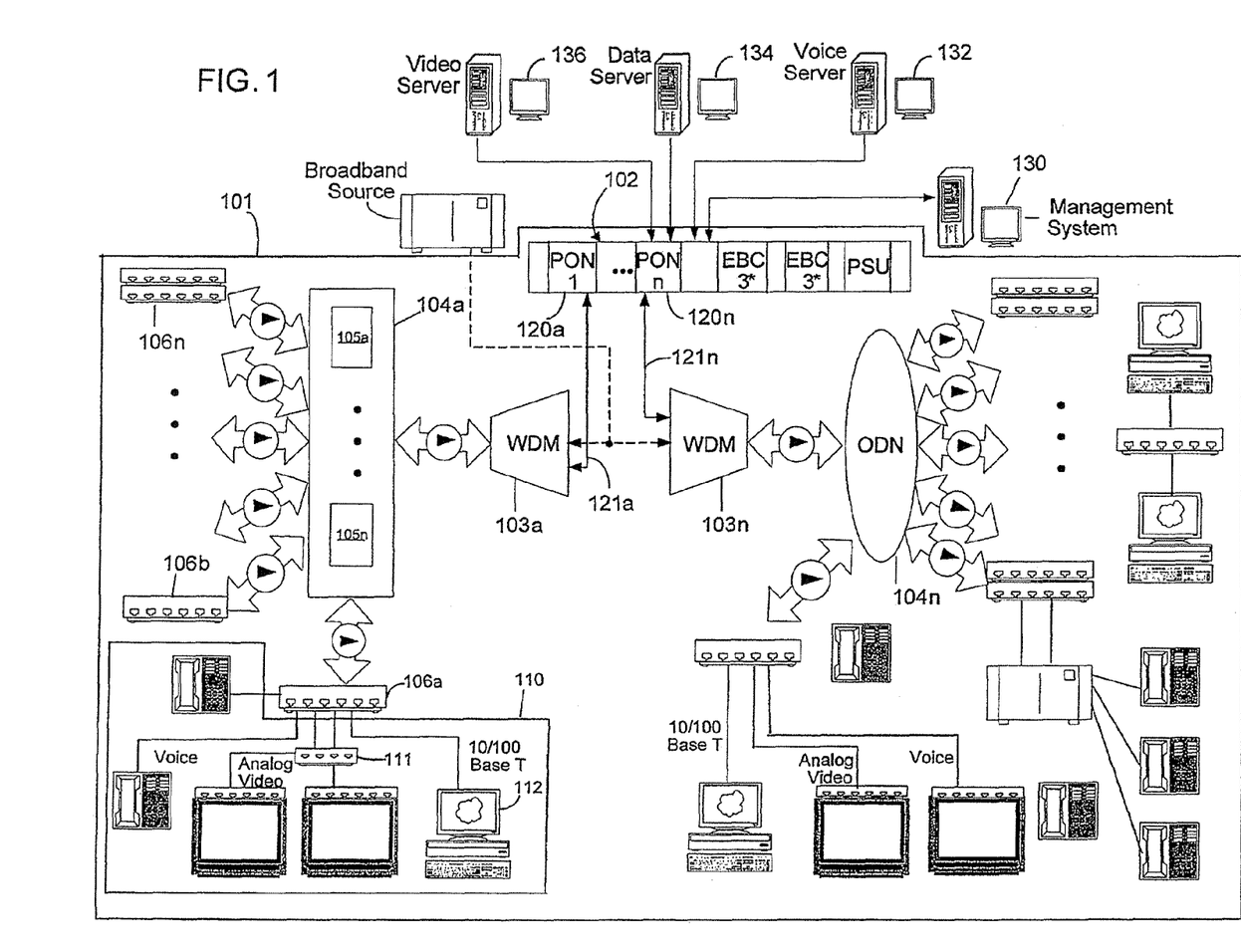
FIG. 1 is a diagram of an FTTx network, which is one example of a suitable environment in which the invention can be implemented.

FIG. 1 is a network diagram of an example communication system or network according to an example embodiment of the present invention, including a passive optical network (PON) 101. PON 101 includes an optical line terminal (OLT) 102, wavelength division multiplexers 103a-n, optical distribution network (ODN) devices 104a-n, ODN device splitters (e.g., 105a-n associated with ODN device 104a), optical network terminals (ONTs) (e.g., 106a-n corresponding to ODN device splitters 105a-n), and customer premises equipment (CPE), such as CPE 110. OLT 102 includes PON cards 120a-n (which could be, for example, broadband passive optical network (BPON) cards, gigabit passive optical network (GPON) cards, etc.), each of which provides an optical feed (121a-n) to ODN devices 104a-n. Optical feed 121a, for example, is distributed through corresponding ODN device 104a by separate ODN device splitters 105a-n to respective ONTs 106a-n, in order to provide communications to and from CPE 110 operably coupled to a port of the ONT.

The PON 101 may be deployed for fiber-to-the-business (FTTB), fiber-to-the-curb (FTTC), and fiber-to-the-home (FTTH) applications, for example. The optical feeds 121a-n in PON 101 may operate at bandwidths such as 155 Mb/sec, 622 Mb/sec, 1.25 Gb/sec, and 2.5 Gb/sec or any other desired bandwidth implementations. The PON 101 may incorporate, for example, ATM communications, broadband services such as Ethernet access and video distribution, Multimedia over Cable Alliance (MoCA) services, Ethernet point-to-multipoint topologies, BPON communications, GPON communications, Ethernet passive optical network (EPON) communications, and native communications of data and time division multiplex (TDM) formats. Customer premises equipment (e.g., 110) which can receive and provide communications in the PON 101 may include standard telephones (e.g., Public Switched Telephone Network (PSTN)), Internet Protocol telephones, Ethernet units, broadband home routers (e.g., 111), computer terminals (e.g., 112), digital subscriber line connections, cable modems, wireless access, as well as any other type of customer premises equipment. These various services can be provided by, for example, a plurality of servers, such as a server 132 that supports voice applications, a server 134 that supports data applications, and a server 136 that supports video applications, although in other systems the functionality of those servers may be performed by only a single server or by a combination of servers.

PON 101 can include one or more different types of ONTs (e.g., 106a-n). Each ONT is associated with a user, typically a user that subscribes to network services offered by a service provider operating the FTTx system. Each user can be associated with at least one of a plurality of maximum allocations of bandwidth. For example, the service provider can provide different levels of service at different prices, each level of service having a different maximum bandwidth allocation. Once a user subscribes to a particular level, the user (i.e., the user's ONT) is associated with the maximum allocation of bandwidth for that level.

In another arrangement, subscriber service levels can be defined based on a combination of normalized maximum bandwidth allocations and weights. In this case, each user can be associated with one of the plurality of normalized maximum bandwidth allocations and with at least one of a plurality of weights. The maximum bandwidth allocation for a user equals the product of the user's normalized maximum bandwidth allocation and weight. Once a user subscribes to a particular level, the user (i.e., the user's ONT) is associated with the normalized maximum allocation of bandwidth and weight for that level.

Each ONT 106a-n is operably coupled with an ODN device 104a through associated ODN device splitters 105a-n via a data port. Each ODN device 104a-n in turn communicates with an associated PON card 120a-n through respective wavelength division multiplexers 103a-n. Wavelength division multiplexers 103a-n are optional components which are used when video services are provided. Communications between the ODN devices 104a-n and the OLT 102 occur over a downstream wavelength and an upstream wavelength. The downstream communications from the OLT 102 to the ODN devices 104a-n may be provided at, for example, 622 megabits per second, at least some of which can be shared across all ONTs connected to the ODN devices 104a-n by allocating the bandwidth in a Max-Min fair manner. The upstream communications from the ODN devices 104a-n to the PON cards 120a-n may be provided at, for example, 155 megabits per second, at least some of which is shared among all ONTs connected to ODN devices 104a-n by allocating the bandwidth in a Max-Min fair manner. In either or both of the downstream and upstream cases, the sharing can be of the entire bandwidth across all the connected ONTs, or some of the bandwidth can be allocated on demand to at least some of them in fixed or gradually varying quantities, and the remaining bandwidth can be allocated in a Max-Min fair manner among the ONTs that request more bandwidth.

Bandwidth allocation in the example environment of FIG. 1 can be performed by an element management system (EMS) 130 that manages OLT 102, or by any other suitable network element, although the present description is described in the context of the EMS 130 performing that function. Since OLT 102 includes PON cards 120a-n, each PON card 120a-n is also managed by EMS 130. As such, a single EMS manages all PON cards within a PON. The management function executed by EMS 130 includes allocating downstream bandwidth, e.g. 622 megabits per second, and upstream bandwidth, e.g. 155 megabits per second, at least some of which can be each shared in a Max-Min fair manner among all ONTs as described above. EMS 130 allocates bandwidth among the ONTs by procedures according to the present invention, example embodiments of which are described below.

Of course, other arrangements of an FTTx system such as the one shown in FIG. 1 are possible, as one skilled in the art would recognize in view of this description. For example, a single EMS may manage or otherwise be associated with more than one PON. Therefore, a single EMS is not limited to managing PON cards within a single PON, but may manage PON cards from several PONs. In another example embodiment, the available bandwidths could be different for different PONs, and an EMS can allocate a bandwidth associated with a particular PON in a Max-Min fair manner among ONTs in the particular PON. In other systems, more than one EMS can be employed to manage one or more PON cards within a single PON or plural PONs.

Figure 2:
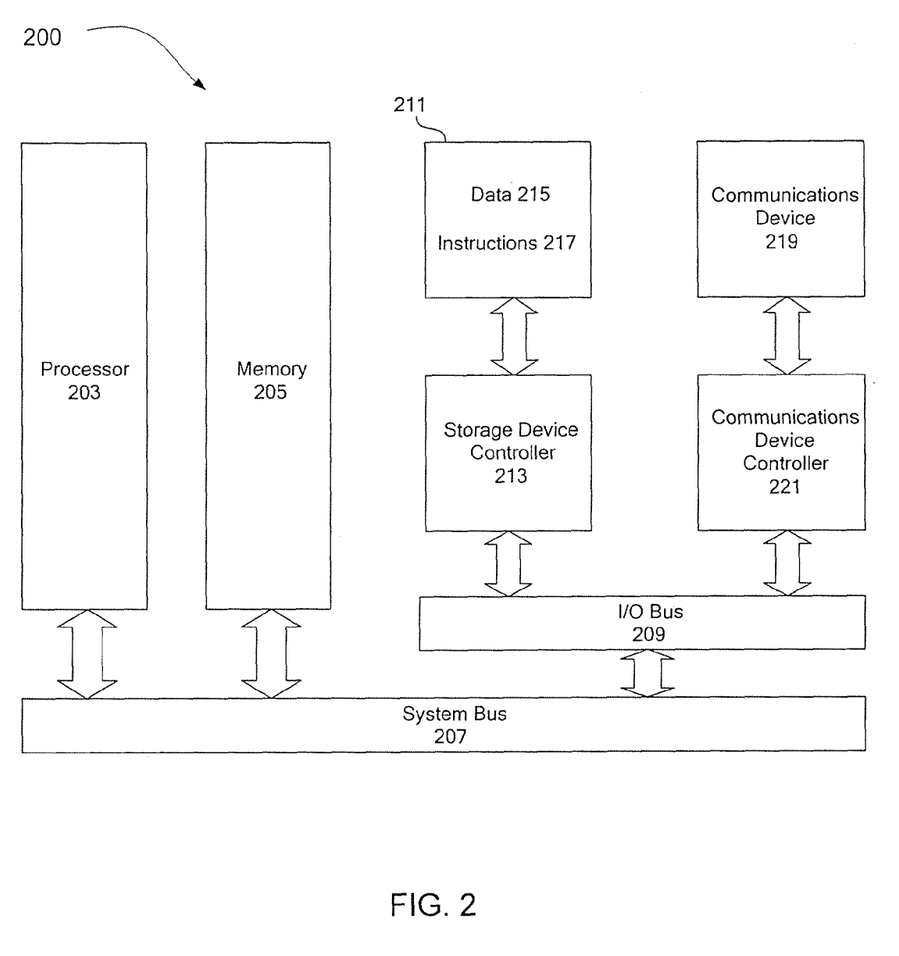
FIG. 2 is an architecture diagram of an example data processing system.

FIG. 2 is an architecture diagram of an example data processing system 200, which could be used as an EMS 130 for performing allocation of bandwidth in accordance with one example of the present invention to be described below. The system 200 also can represent an example embodiment of individual ones of the components of FIG. 6 and individual ones of the components 102, 104a-n, 106a-n, 110, 132, 134, and 136 of FIG. 1.

Data processing system 200 includes a processor 203 coupled to a memory 205 via system bus 207. The processor 203 is also coupled to external Input/Output (I/O) devices (not shown) via the system bus 207 and an I/O bus 209. A storage device 211 having a computer-readable medium is coupled to the processor 203 via a storage device controller 213 and the I/O bus 209 and the system bus 207. The storage device 211 is used by the processor 203 and controller 213 to store and read/write data 215 and computer-executable program instructions 217 used to implement procedures to be described below. For example, those instructions 217 can perform any of the procedures described below in conjunction with FIGS. 3 and 4 for allocating available bandwidth, and data stored in the device 211 can include at least various variables and other information used in the algorithms described below. Such variables and information can be generated at or be pre-programmed into the EMS 130 (or another network element), for example, or can be provided thereto from another source within or outside of the network.

The processor 203 may be further coupled to a communications device 219 via a communications device controller 221 coupled to the I/O bus 209. The processor 203 uses the communications device 219 for network communications, such as, e.g., file downloading, traffic routing, transmission and receipt of data, control messages, etc.

In operation, the processor 203 loads the program instructions 217 from the storage device 211 into the memory 205. The processor 203 then executes the loaded program instructions 217 to allocate available bandwidth. Thus, processor 203 operates under the control of the instructions 217 to perform example procedures, as will be described in more detail below.

Figure 3:
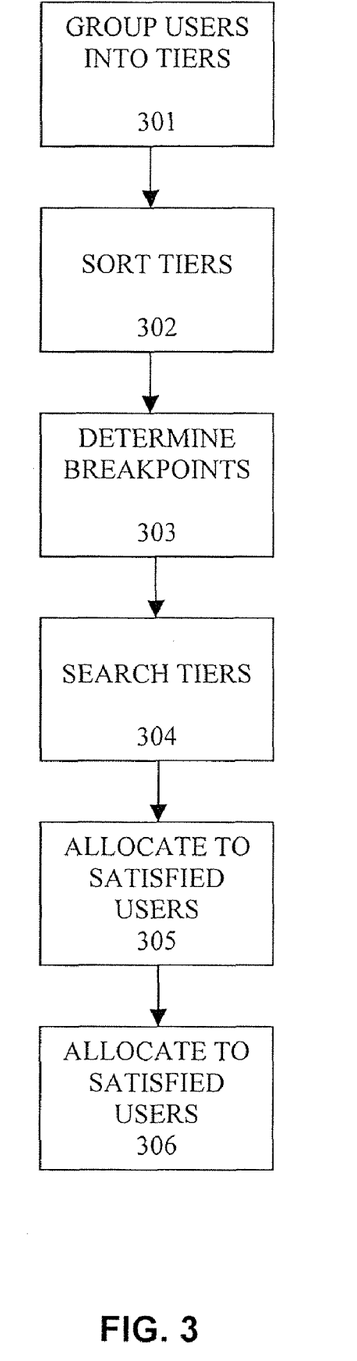
FIG. 3 is a flowchart of a procedure of allocating available bandwidth according to an example embodiment of the present invention.

FIG. 3 is a flowchart of a procedure of allocating available bandwidth according to one example embodiment of the invention. Specifically, a quantity of bandwidth A is to be allocated among a set of users U, $\{U_{ij}\}$, each user associated with one of a plurality of maximum bandwidth allocations ($M_i$, where $1 \leq i \leq L$). The users are grouped (301) into a plurality of tiers ($\tau_i$), such that users having the same maximum allocation are grouped into the same tier. In other words, all users having a maximum allocation of $M_1$ are grouped into tier $\tau_1$, all users having a maximum allocation of $M_2$ are grouped into tier $\tau_2$, etc. After the grouping, there are L tiers, e.g., $\tau_1, \tau_2 \ldots \tau_L$, and the number of users in any given tier $\tau_i$ (i.e. the cardinality of the tier) is denoted $N_i$. In a concise notation, the tiers are denoted:

$$\tau_i = \{U_{ij}, 1 \leq i \leq L, 1 \leq j \leq N_i\}.$$

For example, tier $\tau_1$ includes users $U_{11}, U_{12}, \ldots U_{1N_1}$, tier $\tau_2$ includes users $U_{21}, U_{22}, \ldots U_{2N_2}$, etc. Of course, a tier can include a single user.

Therefore, each element of U is an element of exactly one tier $\tau_i$, so $U = \tau_1 \cup \tau_2 \cup \ldots \tau_L$. Note from the definition of U that the number of distinct maximum bandwidth allocation values $M_i$ is denoted L, and the number of users that share a given value (i.e. the cardinality of tier $\tau_i$) is denoted $N_i$.

Information employed to perform process (301), including, for example, tier information, can be pre-programmed into the system 200, or can be obtained from a device external from the system 200 but in communication therewith. In an example embodiment of the invention in which process (301) is performed by the EMS, each user can represent a substantially static allocation profile that may change on the order of days, months, or at some other predetermined time intervals or times, and the information can be pre-programmed into the EMS upon service subscription or otherwise. However, the scope of the invention is not limited to this specific example only, and, in other examples, allocation profiles can be more dynamic and the information can be obtained accordingly.

The tiers are sorted (302) from lowest value to highest value of associated M, i.e. $M_1<M_2<\ldots<M_L$. It is noted that the two-dimensional structure assumed for the users, denoted by the two subscripts, is not limiting in any way. For example, even if each user has a unique maximum allocation, this structure still suffices. In that case $N_i=1$ for all i, and j=1 for every user. So, the procedure works correctly no matter how many distinct M values there are.

Breakpoints $B_k$ of the tiers are determined (303). In one example, the breakpoint of a tier $\tau_k$ is defined as the minimum amount of bandwidth allocated in a Max-Min fair manner such that all users in tiers $\tau_1, \tau_2, \ldots \tau_k$ are satisfied (i.e. each receives its maximum allocation $M_i$), and all users in tiers $\tau_{k+1}, \tau_{k+2}, \ldots \tau_L$ receive at least $M_k$ where k=1, 2, ... L (i.e. each is unsatisfied, and is limited to a fair share). In one example embodiment of the invention, k is a variable representing an index on a set, wherein the set is a collection of maximum allocation values, or "tiers". By example only, in a case where there are one thousand users grouped into five sets corresponding to five maximum allocation values, and there are two hundred users per tier, then if the amount to be allocated is small (e.g., less than B1), then all one thousand users receive the same allocation. If the amount is greater than B1 but less than B2, then the two hundred users in the first tier receive their maximum allocation M1, and the remaining eight hundred users split the remainder equally (or in weighted fashion more generally), and the like. As another example, if the amount to be allocated exceeds B5, then each user receives its respective maximum allocation, and some of the amount to be allocated remains unallocated.

The breakpoint of a tier $\tau_k$ also can be defined as the amount of bandwidth allocated in a Max-Min fair manner such that all users in tiers $\tau_1, \tau_2, \ldots \tau_k$ are satisfied (i.e. each receives its maximum allocation $M_i$), and all users in tiers $\tau_{k+1}, \tau_{k+2}, \ldots \tau_L$ receive $M_k$, (i.e. each is unsatisfied, and is limited to a fair share). In other words, $B_k$ is just enough bandwidth to satisfy the users in tier $\tau_k$, but no more. If the amount of bandwidth to be allocated, A, satisfies $B_k<A<B_{k+1}$, then the excess bandwidth $A-B_k$ (the bandwidth remaining after a Max-Min fair allocation has satisfied the users in tiers $\tau_1, \tau_2, \ldots \tau_k$) will be allocated in a fair manner among the users in tiers $\tau_{k+1}, \tau_{k+2}, \ldots \tau_L$.

One example procedure of computing breakpoints starts by setting $B_0=0$, $M_0=0$, and $B_{L+1}=\infty$ (i.e. a very high number). Then each $B_k$ is computed as a function of $B_{k-1}$, $M_k$, $M_{k-1}$, and $T_k$, where $T_k$ is the number of users in tier $\tau_k$ and higher tiers.

$$B_k = B_{k-1} + (M_k - M_{k-1})T_k, k=1, 2, \ldots, L.$$

In this manner, breakpoints are determined according to the procedure (303). According to an example embodiment of the invention, the procedures (301) to (303) are executed once to set up the overall algorithm of FIG. 3, and the procedures (304) to (306) to be described below are then each performed for each separate allocation of an available bandwidth A (e.g., multiple times per second), although in other embodiments they can be performed in other suitable manners, such as not for each separate allocation.

Procedure (304) will now be described. For each A to be allocated, the sorted list $\{B_0, B_1, B_2, \ldots, B_L, B_{L+1}\}$ is searched (304) to find where A fits, i.e. to find K such that $B_K \leq A < B_{K+1}$:

$$K = \text{search}(A, B_0, B_1, B_2, \ldots, B_L, B_{L+1}).$$

Any suitable search algorithm can be employed in procedure (304). The search algorithm may be chosen to take advantage of a priori information, if available. For example, if K is uniformly distributed across the set of indices 0, 1, ..., L, a binary search may be most appropriate. On the other hand, if it is known that A is likely small compared to the B thresholds, a linear search starting with $B_1$ may perform better.

In procedure (305), all users in tiers $\tau_i$, $1 \leq i \leq K$, (if any) are assigned their maximum allocation of bandwidth:

allocate $M_i$ to all $U_{ij}$=such that i=1, 2, ..., K and j=1, 2, ... $N_i$.

Note, if K=0 then no user receives its maximum allocation. Each "unsatisfied" user, i.e. users in tiers $\tau_i$, $K+1 \leq i \leq L$, (if any), is assigned in procedure (306) a fair share of the remaining bandwidth. For (j=1; $j \leq N_i$; ++j): allocate $$\frac{A - B_k}{T_{k+1}} + M_k$$

to each $U_{ij}$ such that i=k+1, k+2, ..., L and j=1, 2, ..., $N_i$. Note, if K=L, all users receive their maximum allocation and this equation does not apply.

Note that, in one example embodiment, each user is assigned its Max-Min fair share in one assignment statement. There is no need to assign partial quantities iteratively, nor is there a need to initiate each quantity to zero before the assignment, although in other embodiments the procedure may be performed to do so.

Figure 4:
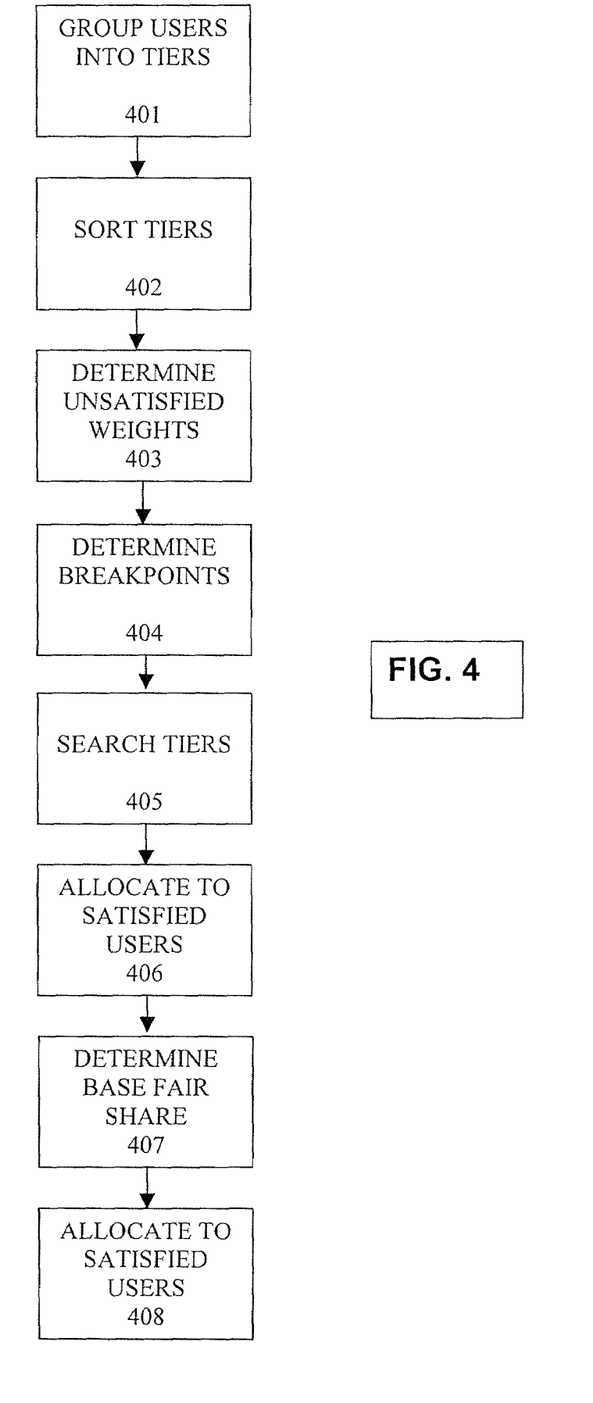
FIG. 4 is a flowchart of a procedure of allocating available bandwidth according to another example embodiment of the present invention.

FIG. 4 is a flowchart of a procedure of allocating available bandwidth according to another example embodiment of the invention, in which a quantity of bandwidth A is to be allocated among a set of users U. In this example embodiment, each user $U_{ij}$ is associated with one of a plurality of normalized maximum allocations ($M'_i$, where $1 \leq i \leq L$) and a weight $w_{ij}$.

The users are grouped (401) into a plurality of tiers ($\tau_i$), such that users having the same normalized maximum allocation are grouped into the same tier. In other words, all users having a normalized maximum allocation of $M'_1$ are grouped into tier $\tau_1$, all users having a normalized maximum allocation of $M'_2$ are grouped into tier $\tau_2$, etc. The number of users in any given tier is denoted $N_i$. In a concise notation, the tiers are denoted:

$$\tau_i\{U_{ij}, 1 \leq i \leq L, 1 \leq j \leq N_i\}.$$

The tiers are sorted (402) from lowest value to highest value of associated M', i.e. $M'_1 < M'_2 < \ldots < M'_L$.

As mentioned above, each user $U_{ij}$ is also associated with a weight $w_{ij}$. The maximum allocation that a user $U_{ij}$ can receive is the product of its weight and its normalized maximum allocation, i.e. $w_{ij} * M'_i$. The weight $w_{ij}$ also determines fair share for a user that has not been allocated its maximum (i.e., all such users receive bandwidth in a ratio of their respective weights).

For each tier, an "unsatisfied weight" is determined (403) as:

$$W_k = \sum_{i=k+1}^{L} \sum_{j=1}^{N_i} w_{ij} \quad k = 0, 1, \ldots, L.$$

The unsatisfied weight of a tier is an aggregate sum of weights of the users in higher tiers, i.e. in tiers associated with higher values of normalized maximum allocation. By definition, $W_0$ is the sum of all user weights and $W_L=0$. The unsatisfied weights can be determined by starting with $W_L=0$, and then compute each $W_k$ as a function of $W_{k+1}$:

$$W_L=0;$$

$$W_k = W_{k+1} + \sum_{j=1}^{N} w_{k+1,j}, k = 0, 1, \ldots, L-1$$

Breakpoints $B_k$ of the tiers are determined (404). In one example embodiment of the invention, the breakpoint of a tier $\tau_k$ is defined as the minimum amount of bandwidth allocated in a weighted Max-Min (WMM) manner such that all users in tiers $\tau_1, \tau_2, \ldots \tau_k$ are satisfied (i.e. each receives its maximum allocation $w_{ij}*M'_i$), and all users in tiers $\tau_{k+1}, \tau_{k+2}, \ldots \tau_L$ receive at least $w_{ij}*M'_k$, (i.e. each is unsatisfied, and is limited to a weighted fair share). The breakpoint of a tier $\tau_k$ also can be defined as the amount of bandwidth allocated in a weighted Max-Min (WMM) manner such that all users in tiers $\tau_1, \tau_2, \ldots \tau_k$ are satisfied (i.e. each receives its maximum allocation $w_{ij}*M'_i$), and all users in tiers $\tau_{k+1}, \tau_{k+2}, \ldots \tau_L$ receive $w_{ij}*M'_k$, $M_k$, (i.e. each is unsatisfied, and is limited to a weighted fair share). If the amount of bandwidth to be allocated, A, satisfies $B_k<A<B_{k+1}$, then the excess bandwidth $A-B_k$ (the bandwidth remaining after a WMM allocation has satisfied the users in tiers $\tau_1, \tau_2, \ldots \tau_k$) will be allocated in a weighted fair manner among the users in tiers $\tau_{k+1}, \tau_{k+2}, \ldots \tau_L$.

In this manner, breakpoints are determined according to the procedure (404). According to an example embodiment of the invention, the procedures (401) to (403) are executed once to set up the overall algorithm of FIG. 4, and the procedures (404) to (406) to be described below are then each performed for each separate allocation of an available bandwidth A (e.g., multiple times per second), although in other embodiments they can be performed in other suitable manners, such as not for each separate allocation.

Procedure (404) will now be described. One example procedure of computing breakpoints starts by setting $B_0=0$, $M'_0=0$, and $B_{L+1}=\infty$ (i.e. a very high number). Then each $B_k$ is computed as a function of $B_{k-1}$, $M'_k$, $M'_{k-1}$, and $W_{k-1}$ for (k=1; k≦L; ++k):

$$B_k=B_{k-1}+(M'_k-M'_{k-1})W_{k-1}.$$

For each A to be allocated, the sorted list $\{B_0, B_1, B_2, \ldots, B_L, B_{L+1}\}$ is searched (405) to find where A fits, i.e. find K such that $B_K \leq A < B_{K+1}$:

$$K=\text{search}(A, B_0, B_1, B_2, \ldots, B_L, B_{L+1}).$$

All users in tiers $\tau_i$, $1 \leq i \leq K$, (if any) are assigned (406) their maximum allocation of bandwidth:

allocate $U_{ij}=w_{ij}*M'_i$ for all $i=1, 2, \ldots, K$ and $j=1, 2, \ldots, N_i$.

Note that if K=0, no user receives its maximum allocation. For users in tiers $\tau_i$, $K+1 \leq i \leq L$, (if any), a base fair share quantity is determined (407):

$$\text{base}=((A-B_K)/W_K)+M'_K;$$

and each of these "unsatisfied" users is assigned (408) a weighted multiple of the base fair share quantity:

$U_{ij}=w_{ij}*\text{base}$ for $i=K+1, K+2, \ldots, L$ and $j=1, 2, \ldots, N_i$.

If K=L then each user receives its maximum allocation and the equation above does not apply.

Note that each user $U_{ij}$, $i=K+1, \ldots, L$, is assigned its weighted Max-Min fair share in one assignment statement, in an example embodiment of the invention, although in other examples they are not assigned in one assignment statement.

Figure 5:
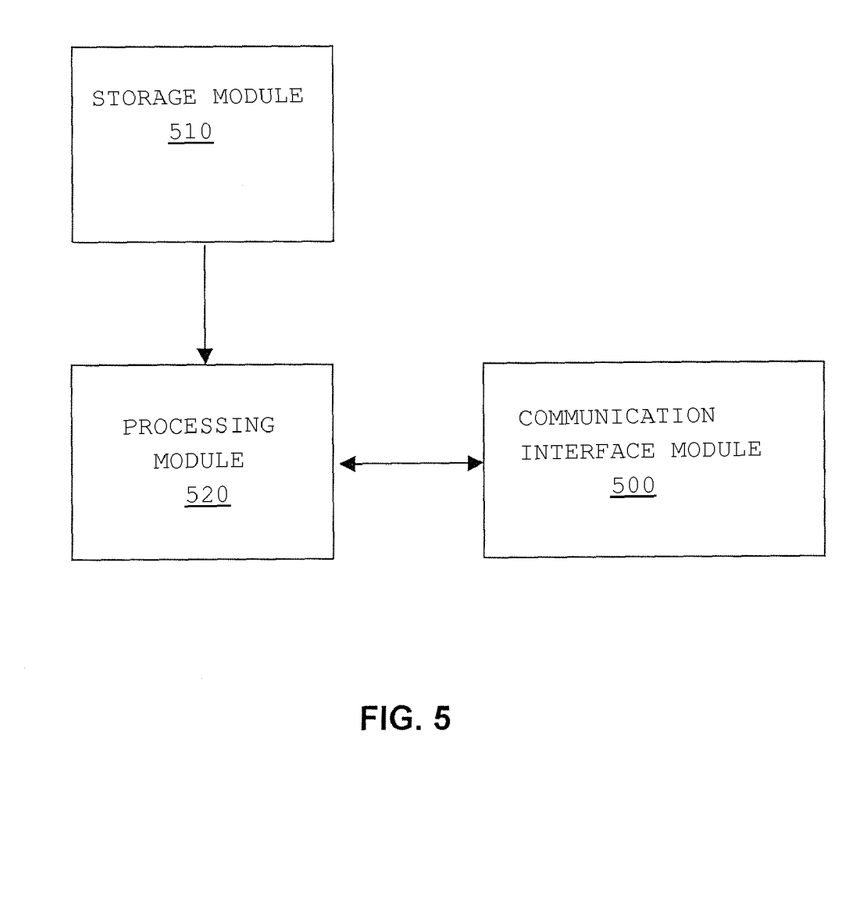
FIG. 5 is a logical diagram of functional modules in accordance with an example embodiment of the invention.

FIG. 5 is a logical diagram of modules in accordance with an example embodiment of the invention. The modules may be of a data processing system 200, which, according to an example embodiment, can implement EMS 130 or another network element to perform allocation of available bandwidth according to procedures of the invention, such as the foregoing example embodiments. The modules may be implemented using hardcoded computational modules or other types of circuitry, or a combination of software and circuitry modules.

A communication interface module 500 controls a communications interface (such as device 219 of FIG. 2) by processing interface commands. The interface commands may be, for example, commands to access tier information, allocate bandwidth, group users, etc.

A storage module 510 stores and retrieves data (e.g., bandwidth information, user information, variables etc.) in response to requests from the processing module 520.

In the case of allocation of bandwidth, the processing module 520 performs the procedures as described above in connection with FIG. 3 and/or FIG. 4. Module 520 can include multiple sub-modules arranged to perform respective ones of the procedures 301 to 306 of FIG. 3 and/or respective ones of the procedures 401 to 408 of FIG. 4.

Although this invention has been described in certain specific example embodiments, many additional modifications and variations would be apparent to those skilled in the art. It is therefore to be understood that this invention may be practiced otherwise than as specifically described. Thus, the example embodiments of the invention should be considered in all respects as illustrative and not restrictive, the scope of the invention to be determined by any claims supportable by this application and the claims' equivalents rather than the foregoing description.

Software embodiments of the invention may be provided as a computer program product, or software, that may include an article of manufacture on a machine accessible or computer-readable medium (memory) having instructions. The instructions on the machine accessible or computer-readable medium may be used to program a computer system or other electronic device. The computer-readable medium may include, but is not limited to, floppy diskettes, optical disks, CD-ROMs, and magneto-optical disks or other types of media/computer-readable medium suitable for storing or transmitting electronic instructions. The techniques described herein are not limited to any particular software configuration. They may find applicability in any computing or processing environment. The terms "memory", "machine accessible medium" or "computer-readable medium" used herein shall include any medium that is capable of storing, encoding, or transmitting a sequence of instructions or data for execution by the machine and that cause the machine to perform any one of the procedures described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs.

In addition, it should be understood that the figures illustrated in the attachments, which highlight the functionality and advantages of the invention, are presented for example purposes only. The architecture of the invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the invention in any way. It is also to be understood that the steps and processes recited in the claims need not be performed in the order presented.

What is claimed is:

1. A method of allocating an amount of available bandwidth among a plurality of users of a computer network, each user having a maximum allocation of bandwidth, the method comprising:

accessing tier information of a plurality of tiers in which users having a same maximum allocation are grouped into a same tier, the tier information including a breakpoint value of each tier; and allocating the available bandwidth by (1) allocating the respective maximum allocations to the users in each lower tier, each lower tier having a breakpoint value less than or equal to the amount of available bandwidth, and (2) allocating a minimum allocation of bandwidth to each user in a higher tier, each higher tier having a breakpoint value greater than the amount of available bandwidth, the minimum allocation of bandwidth being at least the maximum allocation of bandwidth of the users in the lower tier that has the highest breakpoint value among the breakpoint values of each lower tier, the breakpoint value of a lowest tier being a function of a product of the lowest maximum allocation and a total number of users in the plurality of users, and the breakpoint value of at least one higher tier being a function of the sum of (1) the breakpoint value of a lower tier and (2) the product of (a) a number of users in tiers corresponding to maximum allocations greater than a lower maximum allocation associated with the lower tier and (b) a difference between a higher maximum allocation associated with the at least one higher tier and the lower maximum allocation associated with the lower tier.

2. The method of claim 1, wherein the accessing comprises:

grouping the users into the plurality of tiers, such that users having a same maximum allocation are grouped into a same tier; and obtaining the breakpoint values of the tiers.

3. The method of claim 2, wherein the obtaining comprises:

determining a breakpoint value of a lowest tier, the lowest tier corresponding to a lowest maximum allocation; and determining a breakpoint value of at least one higher tier corresponding to at least one higher maximum allocation.

4. A method of allocating an amount of available bandwidth among a plurality of users of a computer network, each user having a normalized maximum allocation of bandwidth, the method comprising:

accessing tier information of a plurality of tiers in which users having a same normalized maximum allocation are grouped into a same tier, the tier information including a breakpoint value of each tier, each user also having a weight, and a maximum allocation of bandwidth that is a product of the weight and the normalized maximum allocation of the user; and allocating the available bandwidth by (1) allocating respective maximum allocations to the users in each lower tier, each lower tier having a breakpoint value less than or equal to the amount of available bandwidth, and (2) allocating a minimum allocation of bandwidth to each user in a higher tier, each higher tier having a breakpoint value greater than the amount of available bandwidth, the minimum allocation of bandwidth being at least the maximum allocation of bandwidth of the users in the lower tier that has the highest breakpoint value among the breakpoint values of each lower tier, the breakpoint values of the tiers being obtained by determining a weighting factor, wherein the weighting factor is an aggregate sum of (1) the weights of users in at least one tier and (2) the weights of users in tiers corresponding to normalized maximum allocations greater than the normalized maximum allocation of the tier, if any, and determining an incremental factor of at least one non-lowest tier, wherein the incremental factor of the at least one non-lowest tier is a function of a product of (1) the weighting factor and (2) a difference between the normalized maximum allocation of the at least one non-lowest tier and a lower normalized maximum allocation associated with a lower tier than the non-lowest tier, and the breakpoint value of a lowest tier being a function of a product of the lowest normalized maximum allocation and the weighting factor of the lowest tier, and the breakpoint value of the at least one non-lowest tier being a function of a sum of (1) the breakpoint value of a lower tier and (2) the incremental factor of the at least one non-lowest tier.

5. The method of claim 4, wherein the accessing comprises:

grouping the users into the plurality of tiers, such that users having a same normalized maximum allocation are grouped into a same tier; and obtaining the breakpoint values of the tiers.

6. The method of claim 5, wherein the obtaining comprises:

determining a breakpoint value of a lowest tier, the lowest tier corresponding to a lowest normalized maximum allocation; and determining a breakpoint value of at least one higher tier corresponding to at least one higher normalized maximum allocation.

7. The method of claim 4, wherein the lower tier is a next, lower tier.

8. The method of claim 4, wherein the remaining amount of available bandwidth is allocated among the remaining users in accordance with relative weights of the remaining users.

9. An apparatus for allocating an amount of available bandwidth among a plurality of users of a computer network, each user having a maximum allocation of bandwidth, the apparatus comprising:

an accessing unit that accesses tier information of a plurality of tiers in which users having a same maximum allocation are grouped into a same tier, the tier information including a breakpoint value of each tier; and a processor operable to allocate the available bandwidth by (1) allocating the respective maximum allocations to the users in each lower tier, each lower tier having a breakpoint value less than or equal to the amount of available bandwidth, and (2) allocating a minimum allocation of bandwidth to each user in a higher tier, each higher tier having a breakpoint value greater than the amount of available bandwidth, the minimum allocation of bandwidth being at least the maximum allocation of bandwidth of the users in the lower tier that has the highest breakpoint value among the breakpoint values of each lower tier, the breakpoint value of a lowest tier being a function of a product of the lowest maximum allocation and a total number of users in the plurality of users, and the breakpoint value of at least one higher tier being a function of the sum of (1) the breakpoint value of a lower tier and (2) the product of (a) a number of users in tiers corresponding to maximum allocations greater than a lower maximum allocation associated with the lower tier and (b) a difference between a higher maximum allocation associated with the at least one higher tier and the lower maximum allocation associated with the lower tier.

10. The apparatus of claim 9 wherein the processor also is operable to group the users into the plurality of tiers, such that users having a same maximum allocation are grouped into a same tier, and to obtain the breakpoint values of the tiers.

11. The apparatus of claim 10, wherein the processor obtains the breakpoint values of the tiers by determining a breakpoint value of a lowest tier, the lowest tier corresponding to a lowest maximum allocation, and determining a breakpoint value of at least one higher tier corresponding to at least one higher maximum allocation.

12. An apparatus for allocating an amount of available bandwidth among a plurality of users of a computer network, each user having a normalized maximum allocation of bandwidth, the apparatus comprising:

an accessing unit that accesses tier information of a plurality of tiers in which users having a same normalized maximum allocation are grouped into a same tier, the tier information including a breakpoint value of each tier, each user also having a weight and a maximum allocation of bandwidth that is a product of the weight and the normalized maximum allocation; and a processor operable to allocate the available bandwidth by (1) allocating respective maximum allocations to the users in each lower tier, each lower tier having a breakpoint value less than or equal to the amount of available bandwidth, and (2) allocating a minimum allocation of bandwidth to each user in a higher tier, each higher tier having a breakpoint value greater than the amount of available bandwidth, the minimum allocation of bandwidth being at least the maximum allocation of bandwidth of the users in the lower tier that has the highest breakpoint value among the breakpoint values of each lower tier, the breakpoint values of the tiers being obtained by determining a weighting factor, wherein the weighting factor is an aggregate sum of (1) the weights of users in at least one tier and (2) the weights of users in tiers corresponding to normalized maximum allocations greater than the normalized maximum allocation of the tier, if any, and determining an incremental factor of at least one non-lowest tier, wherein the incremental factor of the at least one non-lowest tier is a function of a product of (1) the weighting factor and (2) a difference between the normalized maximum allocation of the at least one non-lowest tier and a lower normalized maximum allocation associated with a lower tier than the non-lowest tier, and the breakpoint value of a lowest tier being a function of a product of the lowest normalized maximum allocation and the weighting factor of the lowest tier, and the breakpoint value of the at least one non-lowest tier being a function of a sum of (1) the breakpoint value of a lower tier and (2) the incremental factor of the at least one non-lowest tier.

13. The apparatus of claim 12, wherein the processor also is operable to group the users into the plurality of tiers, such that users having a same normalized maximum allocation are grouped into a same tier and to obtain the breakpoint values of the tiers.

14. The apparatus of claim 13, wherein the processor obtains the breakpoint values of the tiers by determining a breakpoint value of a lowest tier, the lowest tier corresponding to a lowest normalized maximum allocation, and determining a breakpoint value of at least one non-lowest tier corresponding to at least one non-lowest normalized maximum allocation.

15. The apparatus of claim 12, wherein the lower tier is a next, lower tier.

16. The apparatus of claim 12, wherein the remaining amount of available bandwidth is allocated among the remaining users in accordance with relative weights of the remaining users.

17. A non-transitory computer-readable storage medium on which is stored computer-executable instructions which, when executed by a computer, cause the computer to perform a method for allocating an amount of available bandwidth among a plurality of users of a computer network, each user having a maximum allocation of bandwidth, the method comprising:

accessing tier information of a plurality of tiers in which users having a same maximum allocation are grouped into a same tier, the tier information including a breakpoint value of each tier; and allocating the available bandwidth by (1) allocating the respective maximum allocations to the users in each lower tier, each lower tier having a breakpoint value less than or equal to the amount of available bandwidth, and (2) allocating a minimum allocation of bandwidth to each user in a higher tier, each higher tier having a breakpoint value greater than the amount of available bandwidth, the minimum allocation of bandwidth being at least the maximum allocation of bandwidth of the users in the lower tier that has the highest breakpoint value among the breakpoint values of each lower tier, the breakpoint value of a lowest tier being a function of a product of the lowest maximum allocation and a total number of users in the plurality of users, and the breakpoint value of at least one higher tier being a function of the sum of (1) the breakpoint value of a lower tier and (2) the product of (a) a number of users in tiers corresponding to maximum allocations greater than a lower maximum allocation associated with the lower tier and (b) a difference between a higher maximum allocation associated with the at least one higher tier and the lower maximum allocation associated with the lower tier.

18. A non-transitory computer-readable storage medium on which is stored computer-executable instructions which, when executed by a computer, cause the computer to perform a method for allocating an amount of available bandwidth among a plurality of users of a computer network, each user having a normalized maximum allocation of bandwidth, the method comprising:

accessing tier information of a plurality of tiers in which users having a same normalized maximum allocation are grouped into a same tier, the tier information including a breakpoint value of each tier, each user also having a weight, and a maximum allocation of bandwidth that is a product of the weight and the normalized maximum allocation of the user; and allocating the available bandwidth by (1) allocating respective maximum allocations to the users in each lower tier, each lower tier having a breakpoint value less than or equal to the amount of available bandwidth, and (2) allocating a minimum allocation of bandwidth to each user in a higher tier, each higher tier having a breakpoint value greater than the amount of available bandwidth, the minimum allocation of bandwidth being at least the maximum allocation of bandwidth of the users in the lower tier that has the highest breakpoint value among the breakpoint values of each lower tier, the breakpoint values of the tiers being obtained by determining a weighting factor, wherein the weighting factor is an aggregate sum of (1) the weights of users in at least one tier and (2) the weights of users in tiers corresponding to normalized maximum allocations greater than the normalized maximum allocation of the tier, if any, and determining an incremental factor of at least one non-lowest tier, wherein the incremental factor of the at least one non-lowest tier is a function of a product of (1) the weighting factor and (2) a difference between the normalized maximum allocation of the at least one non-lowest tier and a lower normalized maximum allocation associated with a lower tier than the non-lowest tier, and the breakpoint value of a lowest tier being a function of a product of the lowest normalized maximum allocation and the weighting factor of the lowest tier, and the breakpoint value of the at least one non-lowest tier being a function of a sum of (1) the breakpoint value of a lower tier and (2) the incremental factor of the at least one non-lowest tier.

19. A method of allocating an amount of available bandwidth among a plurality of users of a computer network, each user having a maximum allocation of bandwidth, the method comprising:

accessing tier information of a plurality of tiers in which users having a same maximum allocation are grouped into a same tier, the tier information including a breakpoint value of each tier; and allocating the available bandwidth by (1) allocating the respective maximum allocations to the users in each lower tier, each lower tier having a breakpoint value less than or equal to the amount of available bandwidth, and (2) allocating a minimum allocation of bandwidth to each user in a higher tier, each higher tier having a breakpoint value greater than the amount of available bandwidth, the minimum allocation of bandwidth being at least the maximum allocation of bandwidth of the users in the lower tier that has the highest breakpoint value among the breakpoint values of each lower tier, the breakpoint value of a lowest tier being a function of the lowest maximum allocation and a total number of users in the plurality of users, and the breakpoint value of at least one higher tier being a function of at least the breakpoint value of a lower tier.

20. A method of allocating an amount of available bandwidth among a plurality of users of a computer network, each user having a normalized maximum allocation of bandwidth, the method comprising:

accessing tier information of a plurality of tiers in which users having a same normalized maximum allocation are grouped into a same tier, the tier information including a breakpoint value of each tier, each user also having a weight, and a maximum allocation of bandwidth that is a product of the weight and the normalized maximum allocation of the user; and allocating the available bandwidth by (1) allocating respective maximum allocations to the users in each lower tier, each lower tier having a breakpoint value less than or equal to the amount of available bandwidth, and (2) allocating a minimum allocation of bandwidth to each user in a higher tier, each higher tier having a breakpoint value greater than the amount of available bandwidth, the minimum allocation of bandwidth being at least the maximum allocation of bandwidth of the users in the lower tier that has the highest breakpoint value among the breakpoint values of each lower tier, the breakpoint value of a lowest tier being a function of the lowest normalized maximum allocation and a weighting factor of the lowest tier, and the breakpoint value of the at least one non-lowest tier being a function of the breakpoint value of a lower tier and a weighting factor of the lower tier.

* * * * *